United States Patent [19]

Manservisi et al.

[11] 4,306,648
[45] Dec. 22, 1981

[54] APPARATUS FOR THE FORMATION OF CIGARETTE GROUPS

[75] Inventors: Renato Manservisi; Antonio Zullo, both of Bologna, Italy

[73] Assignee: CIR S.p.A. Divisione SASIB, Bologna, Italy

[21] Appl. No.: 150,658

[22] Filed: May 16, 1980

[30] Foreign Application Priority Data

May 18, 1979 [IT] Italy .................. 12604 A/79

[51] Int. Cl.³ .................. B65B 19/10; B65G 47/10
[52] U.S. Cl. .................. 198/419; 53/149; 53/150; 53/151; 198/420; 414/47
[58] Field of Search .......... 414/30, 47, 63; 53/148, 53/149, 150, 151, 444; 198/419, 420, 422

[56] References Cited

U.S. PATENT DOCUMENTS

| | | | |
|---|---|---|---|
| 2,048,281 | 7/1936 | Muller | 53/150 |
| 2,334,142 | 11/1943 | Arelt | 53/149 |
| 2,890,556 | 6/1959 | Engleson et al. | 198/420 X |
| 3,435,940 | 4/1969 | Seragnoli | 198/420 X |
| 3,448,846 | 6/1969 | Bardenhagen | 198/419 |

Primary Examiner—Leslie J. Paperner
Attorney, Agent, or Firm—Spencer & Kaye

[57] ABSTRACT

The receiving pocket of a cigarette group forming apparatus consists of an open-ended tubular member provided at its interior with two partitions defining three pocket sections, one for each row of cigarettes forming the cigarette group. The partitions extend at the interior of the receiving pocket, from the introduction or inlet end towards the outlet end, for a fraction of the length on the receiving pocket, usually for ⅓ of its length. The partitions become thinner in the direction of the outlet end, and they are also converging in the said direction. Also the inner upper and lower side walls of the receiving pocket converge in the direction of the outlet end.

4 Claims, 7 Drawing Figures

APPARATUS FOR THE FORMATION OF CIGARETTE GROUPS

SUMMARY OF THE INVENTION

The present invention relates to cigarette packing machines and more particularly has for its object an improved apparatus for the formation of regular groups of cigarettes to be packed.

In an apparatus of this type, a regular group of cigarettes, consisting for example of three superposed rows of respectively seven, six and seven cigarettes, is formed by separately preparing, at different row-forming stations, the rows of cigarettes, and by transferring the single cigarette rows into receiving containers (so-called receiving pockets) subsequently arranged on a suitable endless conveyor which is moved with a stepwise movement.

The mentioned receiving pockets may be or not provided with inner partitions. In the first case, the partitions divide the inner space of the receiving pocket into a number of pocket sections equal to the number of cigarette rows to be inserted into the receiving pocket. Each section is defined by four side walls and consequently there is no possibility that the cigarettes of the several rows be disarranged or upset during their movement at the interior of the receiving pocket and during the stepwise movement of the said pocket. On the other hand, the partitions present a certain thickness, which ultimately results into the formation of a certain amount of clearance between the cigarette rows at the moment of their expulsion from the receiving pocket, when they have to be transferred into the compression drum of the packing machine. For this reason, i.e. for eliminating the said clearance between the cigarette rows, there is required the interposition, between the receiving pocket and the compressor drum, of an intermediate compression tube, usually in the form of a tapered conduit.

As mentioned, there may be provided receiving pockets which do not present inner partitions. However, this type of receiving pocket presents the problem of avoiding the upsetting or disarranging of the cigarettes during the movement of the receiving pocket from one row-forming station to the following, to receive the superposed cigarette rows at each row-forming station. In fact, there must be provided means, which are alternately movable, and which are brought substantially into contact with the layer already introduced into the receiving pocket during the motion of the pocket from one row-forming station to the subsequent, in order to avoid the disarranging of the row following to the motion, and which return to inactive position in order to consent the introduction of the subsequent row of cigarettes. This evidently complicates the construction and operation of the apparatus.

According to the present invention, the receiving pocket of a cigarette group forming apparatus consists of an open-ended tubular member provided at its inner cavity with two partitions defining pocket sections for the cigarette rows, said partitions presenting the characteristic feature that they do not extend for the whole length of the pocket (which substantially corresponds to the length of a cigarette) but just for a fraction of this length, starting from the inlet end. Preferably they extend from the inlet end towards the outlet end for a fraction corresponding to ⅓ of the length of the pocket. Moreover, the said partitions, which come thinner in the direction of the outlet end, converge in the said direction, while also the inner upper and lower walls of the pocket converge in the said direction. If desired, also the inner side walls of the receiving pocket may converge in the direction of the outlet end of the pocket.

In his manner, there has been obtained a receiving pocket which practically presents the advantages of both above mentioned prior art types of receiving pockets (i.e. with and without partitions), while it does not present their inconveniences.

BRIEF DESCRIPTION OF THE DRAWINGS

The characterizing feature of the present invention, and the advantage deriving therefrom, will appear more clearly evident from the following detailed description of some preferred embodiments, made with reference to the attached drawings, in which.

DESCRIPTION OF THE PREFERRED EMBODIMENT

Figure 1:
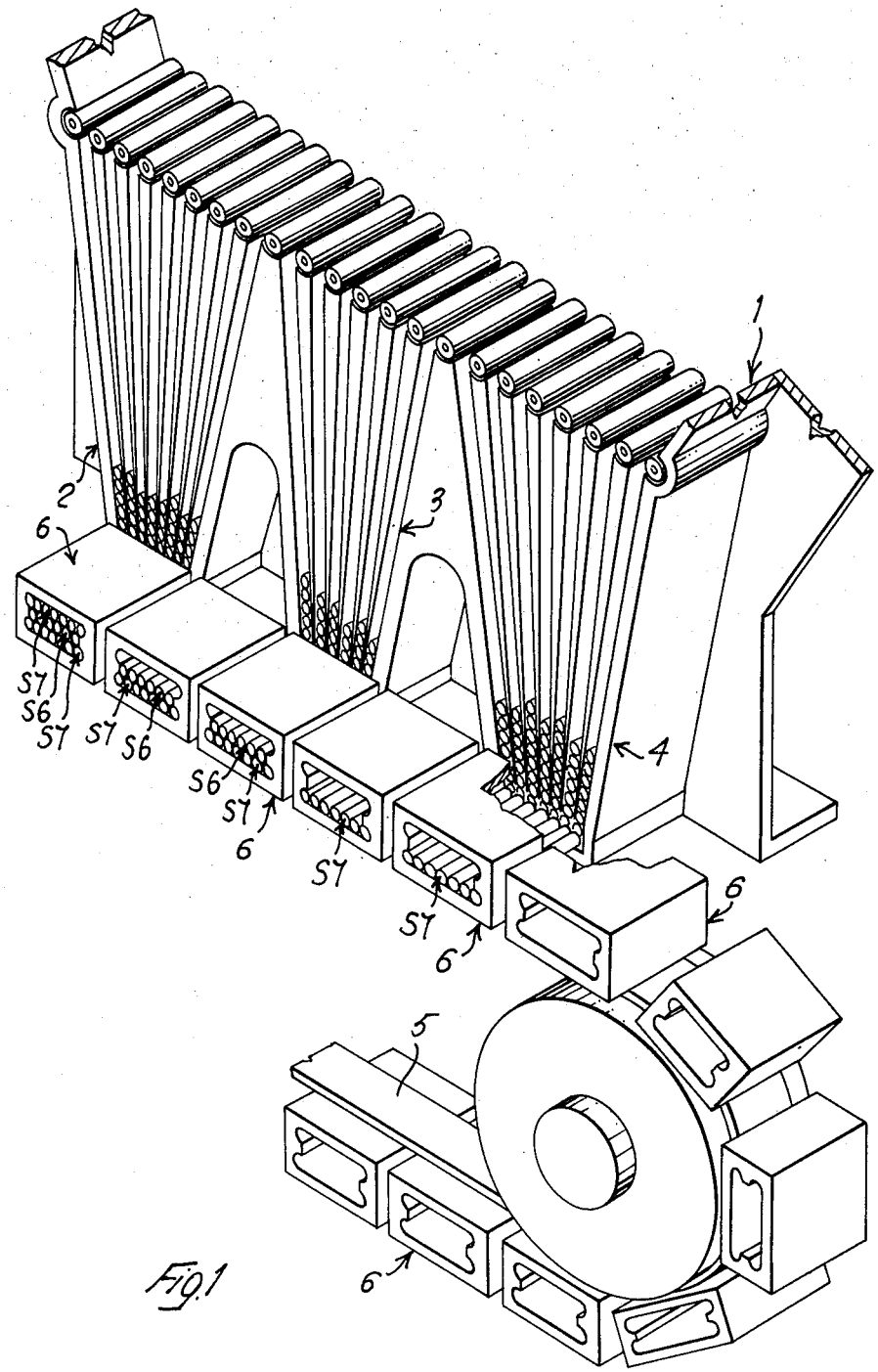
FIG. 1 is a perspective partial view of an apparatus for the formation of regular groups of twenty cigarettes.
Figure 2:
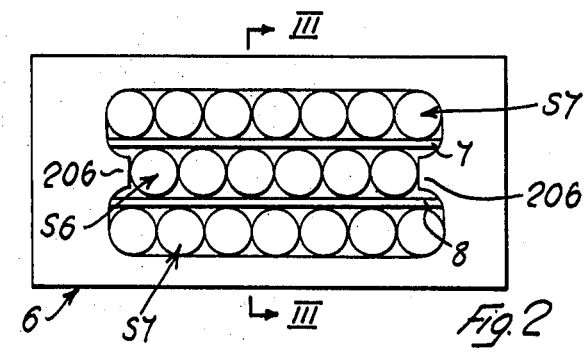
FIG. 2 is a front view, from the inlet or introduction end, of a receiving pocket according to the invention.

In the drawings, there is shown an apparatus which forms regular groups of twenty cigarettes, each group being composed of three superposed rows having seven cigarettes in each of the two outer rows and six cigarettes in the middle row. The cigarettes are contained in a gravity hopper 1 and from the bottom of this hopper are fed into three groups of passageways 2, 3, 4, the discharge ends of which are operatively associated with the path of an endless conveyor 5, which is driven in a stepwise manner and which carries, successively equispaced between each other, the receiving pockets 6 adpated for the reception of the rows of cigarettes formed at the discharge ends of the groups of passageways 2, 3, 4. More precisely, the passageways 4 form a row S7 of seven cigarettes, which constitutes the bottom row of the group of cigarettes being formed, the passageways 3 form a row of six cigarettes S6, which constitutes the middle row of the group of cigarettes, while the passageways 2 form another row S7 of seven cigarettes which constitutes the top row of the group of cigarettes. The rows of cigarettes formed at the discharge ends of the passageways 2, 3 and 4 are inserted, by means of suitable pushers of known type (not shown), into the receiving pockets 6 which progressively are brought in alignment with the said row-forming discharge ends, in the course of the stepwise motion of the endless conveyor 5.

With particular reference to FIGS. 2 to 5, each receiving pocket 6 presents two partitions 7, 8, arranged in correspondence with the inlet end, which is the end into which the cigarette rows are inserted after having been formed at the discharge ends of the passageways. The said partitions, which divide each receiving pocket 6 into as many pocket sections as the cigarette rows to be inserted, become thinner, i.e. present a decreasing width in the direction of introduction of the cigarettes, and present a length which is a fraction (for example ⅓) of the length of the pocket 6 (which is substantially equal to the length of the cigarettes). Moreover, the said partitions converge in the direction of the outlet end of the receiving pocket, i.e. the end from which the formed cigarette group will be discharged. The receiving pocket 6 is defined by two inner vertical side walls 106 which are parallel to each other, as it can be clearly appreciated from FIG. 4, said vertical side walls 106 presenting, in correspondence of the middle row (of six cigarettes), each an inwardly protruding rib 206, which serves to compensate for the absence of a cigarette in the middle row, said ribs 206 being also parallel to each other.

Figure 3:
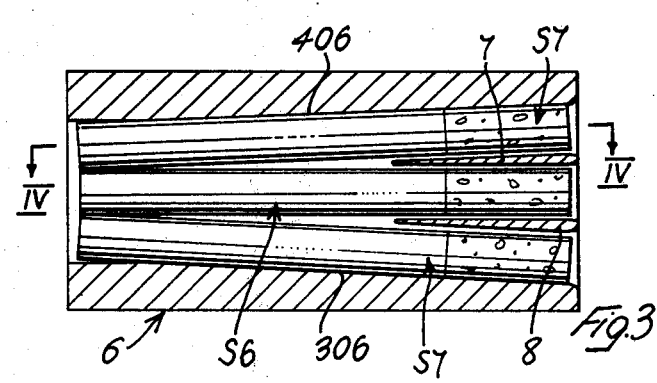
FIG. 3 is a section of a receiving pocket taken along line III—III of FIG. 2.
Figure 4:
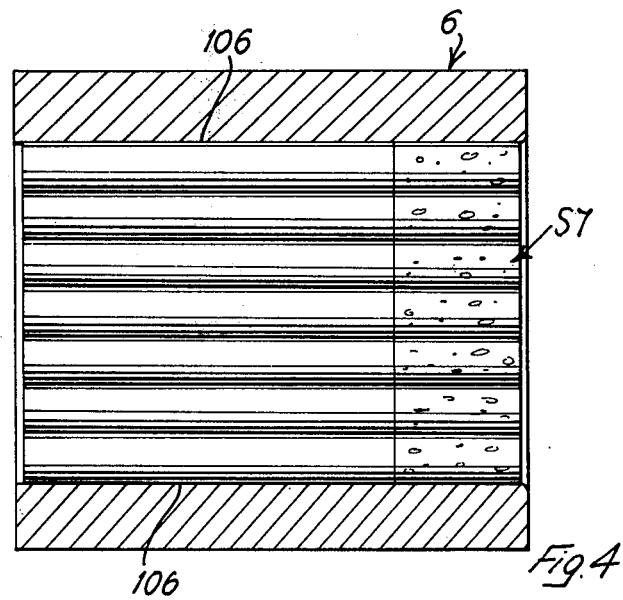
FIG. 4 is a section of a receiving pocket along line IV—IV of FIG. 3.
Figure 5:
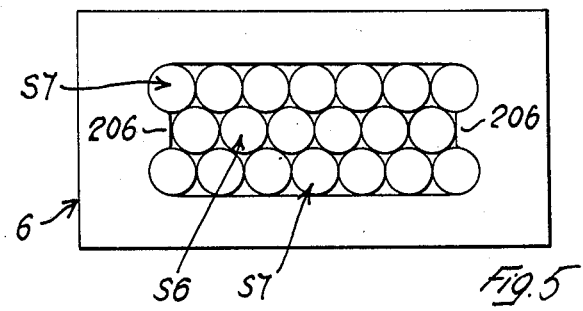
FIG. 5 is a front view, from the outlet end, of a receiving pocket according to the invention.

The lower inner wall 306 and the upper inner wall 406 of the receiving pocket 6 converge in the direction of introduction of the cigarettes, as it clearly appears from FIG. 3, with the exception of a short terminal portion, in correspondence of the outlet end of the receiving pocket 6, where the said inner walls become parallel to each other. The angle of convergence of the said inner walls 306, 406 is the same as the angle of convergence of the partitions 7 and 8. Because of said convergence, the outlet end of the receiving pocket 6 presents (see FIG. 5) a height which is lesser than the height of the inlet end of the said pocket 6 (see FIG. 2). The two partitions 7 and 8, together with the walls of the receiving pocekt 6, define three separate sections at the interior of the said receiving pocket 6, at least for the initial portion of the pocket, and therefore avoid the upsetting or disarranging of the rows of cigarettes as they are introduced into the pocket 6 and during movement of the pocket. Moreover, thanks to the convergence of the inner upper and lower walls 306, 406, and of the said partitions 7 and 8, the cigarettes while being pushed through the receiving pocket, are compressed or compacted, similarly to what is normally done in the usual compression conduits or tubes.

In this manner, the cigarettes can be transferred directly from the receiving pockets 6 into the compression drum of the packaging machine, without the need of the interposition of tapered conduits or tubes, and with a consequent shorter stroke of the pusher (not shown) which effects this operation.

It is to be noted that, in the just described embodiment according to FIGS. 1 to 5, the cigarette rows S7, S6, S7 are introduced into the receiving pocket without any side clearance between the cigarettes of each row. This side clearance, which normally exists between adjoining cigarettes of each row at the row-forming discharge end of the passageways 2, 3, 4, has been in fact eliminated thanks to known means, such as side joggers (not shown), which bring the cigarettes of each row in close side-to-side contact.

Figure 6:
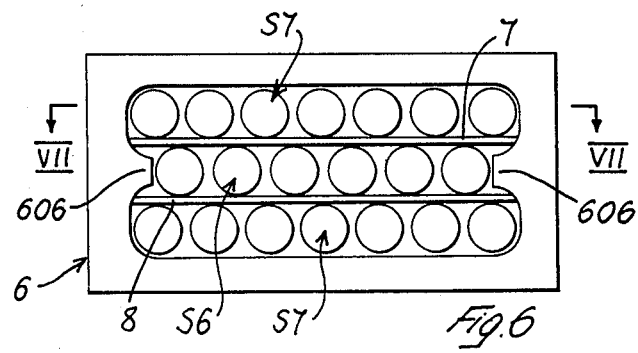
FIG. 6 is a front view, from the inlet or introduction end, fo a modified embodiment of a receiving pocket according to the invention.
Figure 7:
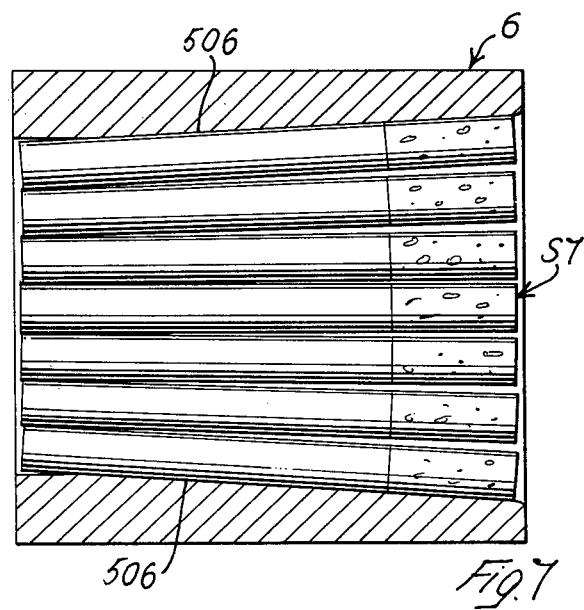
FIG. 7 is a section, along line VII—VII of FIG. 6.

In the embodiment according to FIGS. 6 and 7, also the inner side walls 506 and the inner ribs 606 are converging in the direction of introduction of the cigarettes. Consequently, the receiving pocket 6 presents, in correspondence of its outlet end, both the height and the width which are lesser than the height and width of the inlet end. In this manner, the cigarettes can be introduced into the receiving pocket 6 even with side clearance between each other, as it clearly appears from FIGS. 6 and 7. During their introduction into the receiving pocket 6, the cigarettes are compacted not only in the vertical direction, but also horizontally. It appears evident that in this case there will be no need of devices, such as the side joggers, for eliminating the side clearance between the cigarettes of each row, which normally exists at the row-forming discharge end of the passageways.

The receiving pockets 6 according to the present invention can be made of any suitable material, such as metal or plastics.

It is believed that the invention will have been clearly understood from the foregoing detailed description of some preferred embodiments. Changes in the details of construction may be resorted to without departing from the spirit of the invention, and it is accordingly intended that no limitation be implied and the hereto annexed claims be given the broadest interpretation to which the employed language fairly admits.

We claim:

1. Apparatus for the formation of cigarette groups of at least two parallel superposed rows of cigarettes comprising for each row of cigarettes a plurality of passageways (2, 3, 4) receiving the cigarettes from a feed hopper and terminating with a row-forming discharge end, and comprising also a stepwise-actuated endless conveyor (5) carrying a plurality of tubular receiving pockets (6) into which the cigarette rows are pushed according to the longitudinal direction of the cigarettes, each receiving pocket (6) being open at both ends so as to present an inlet end into which the cigarettes rows are introduced, and an outlet end from which the formed cigarette group can be ejected, each receiving pocket (6) presenting further at least one partition (7, 8) arranged at its interior and dividing the receiving pocket in as many pocket sections as the rows of cigarettes, wherein the improvement resides in the fact that the said partitions (7, 8) extend at the interior of the receiving pocket (6) from the inlet end towards the oulet end of the said pocket for a length which is a fraction of the length of the cigarettes, said partitions becoming progressively thinner in the direction of the outlet end of the receiving pocket, while the inner upper and lower walls (306, 406) of the receiving pocket converge in the direction of the said outlet end.

2. A cigarette group forming apparatus according to claim 1, in which the partitions (7, 8) extend for a length which is equal to ⅓ of the length of the cigarettes.

3. A cigarette group forming apparatus according to claim 1, in which the partitions (7, 8) are more than one and converge in the direction of the outlet end of the receiving pocket (6).

4. A cigarette group forming apparatus according to claim 1, in which also the inner side walls (506) of the receiving pocket (6) converge in the direction of outlet end of the said receiving pocket.

* * * * *